Nov. 1, 1960  C. F. DIETRICH  2,958,255
METHODS FOR INDICATING PROFILES
Filed May 2, 1958

Inventor
Cornelius F. Dietrich
By Watson, Cole, Grindle & Watson
Attorneys

United States Patent Office 2,958,255
Patented Nov. 1, 1960

2,958,255
METHODS FOR INDICATING PROFILES

Cornelius Frank Dietrich, Maidenhead, England, assignor to Optical Measuring Tools Limited, Maidenhead, England, a British company Filed May 2, 1958, Ser. No. 732,727

Claims priority, application Great Britain May 3, 1957

4 Claims. (Cl. 88—14)

This invention comprises improvements in or relating to the methods and apparatus for indicating profiles.

Profile indicating apparatus, for gauging the shape of objects such as turbine blades, is well known. For example, comparators are in use in which a feeler is caused to travel around the profile of an object which is to be gauged and an image to an enlarged scale is thrown upon a screen by optical means which shows the relation of the position of the feeler to a graticule on which the correct shape of the object is marked. Other devices include means for throwing an image of an illuminated portion of the profile on to a screen, and the present invention relates to a device of the latter general type. Hitherto, devices for throwing an image of the profile itself on to a screen have been subject to optical difficulties and have suffered from lack of sharpness of the image. It is an object of the present invention to provide an apparatus which is optically simple and will throw a sharp image.

A further object of the invention is to permit internal profiles of hollow objects to be more readily gauged.

According to the present invention a method of indicating profiles of articles consists in forming a liquid surface in contact with the articles at the profile to be determined and then forming an optical image of the contact line of the liquid with the article. Preferably the liquid is transparent and the light for forming the optical image is transmitted to the liquid surface through the body of the liquid. An opaque liquid however such as mercury can be employed if desired, the device operating then by reflected light from the liquid surface. In either case a sharp image is directly focusable on the screen.

In the case of hollow articles the liquid fills the hollow within the article to the level, the profile of which is to be indicated. This is particularly valuable in the case of such articles as hollow turbine blades or turbine blades which contain internal passages for the circulation of cooling fluid or for other reasons. The shape and location of such passages can be indicated according to the present invention and their disposition at any given section of the article in relation to the external surfaces becomes relatively easy to be measured. In such a case the article may be immersed in the liquid employed so that the liquid flows into the hollow spaces and also is in contact with the external surface of the article.

Preferably the liquid has a high refractive index and where the articles, the profiles of which are to be determined, are hollow, advantage is taken of internal reflection within the article to increase the amount of light passing through the liquid surface.

It has been found that the image cast can be brightened considerably by first bringing the surface of the article into contact with a liquid of lower refractive index such as water and, while some of said liquid is still adherent thereto a liquid of higher refractive index, such as benzene is caused to form a surface with a contact line at the profile to be determined. This is apparently due to minute droplets of the first liquid being formed on the surface of the article which cause internal reflection and increase the illumination at the contact line.

The following is a description by way of example of certain forms of apparatus in which the method of the present invention is employed and which are comprehended within the scope of the invention:

In the accompanying drawings.

Figure 1:
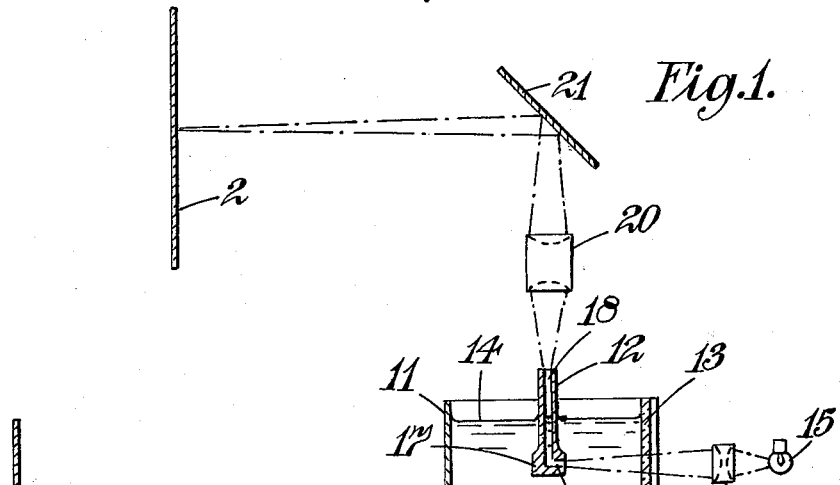
Figure 1 is a diagrammatic vertical section through one form of apparatus.

The apparatus shown in Figure 1 is intended for the testing of the shape of turbine blades having internal passages for cooling liquid. A tank 11 is provided, which is large enough to receive a turbine blade 12 to be tested, and which has a glass side 13. The tank is filled to a suitable height with a liquid 14 having a high refractive index such as, for example, benzene or quinoline. Outside the glass wall of the tank there is a source of light 15 having a condenser 16 in front of it which throws a horizontal beam into the liquid.

The turbine blades 12 have roots 17 and they are pierced longitudinally with a plurality of narrow passages one only of which is shown at 18. These may be only one-tenth of an inch in diameter and yet can be dealt with by this invention, which would be quite impossible by a feeler, or known optical methods. The passages 18 normally have short sections 19 at the root end extending laterally and out through the side of the root as shown. The blades 12 are immersed in the liquid with the ends of the lateral parts 19 of the cooling passages pointing towards the light source. The light is concentrated by the condenser 16 on the ends of the lateral parts 19 of the passages. The liquid 14 enters the internal passages 18, 19 and rises therein to a level corresponding to the level of the liquid outside, although it may be a little higher owing to capillary action, but this can be allowed for so that the level of the liquid within the passages is known. The main length of the passages 18 is vertical.

A projection lens 20 is located in line with the vertical passages, having a fairly long focus. Above the projection lens is a mirror 21 which directs the light passing through the lens on to a screen 2 and the lens is adjusted to focus on the screen an enlarged image of the contact line of the liquid surface with the blade within the passage. If the blade 12 is small enough the projection lens may also focus on to the screen an image of the contact line of the liquid with the external surface of the blade. The relationship of the external and internal surfaces to one another can then be seen directly.

In the case of large or twisted blades, however, the external image is liable to be only partial or inferior in definition. In that case a feeler or feelers (not shown) may be mounted for movement around the external profile and may operate an indicating slide carrying a graticule, in such manner that a spot corresponding to the position of the feeler in relation to the graticule is projected on to the screen in its proper relation to the image of the internal passage. The distance of the passage from the external surface of the blade can thus be observed. A suitable feeler mechanism is described in patent specification No. 2,542,755.

It is found that the higher the refractive index of the liquid in the tank the better is the internal reflection within the blade and the brighter the image on the screen for a given brightness of light source.

We have also found that great intensification of light occurs, particularly when testing small holes, if the testpiece is dipped into water, taken out and shaken to have minute droplets of water on the walls of the bore and then immersed in the test liquid; which may be benzene. Benzene is a liquid immiscible with water and has a much higher refractive index (1.5) than water (1.33) and apparently there is internal reflection at the interfaces of the water droplets and the benzene which intensifies the light along the walls of the hole. Holes even as small as 1/32 of an inch in diameter can be effectively illuminated and their position projected in relation to the outer wall of the test piece, in this way.

Figure 2:
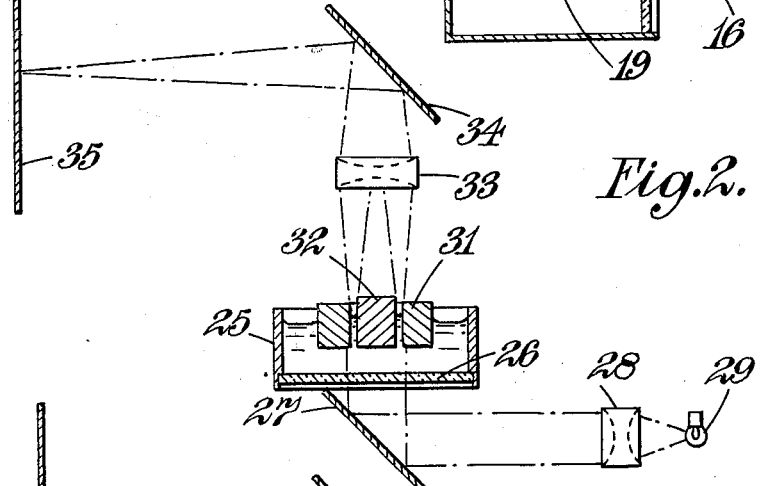
Figure 2 is a similar section through a second form.

In the apparatus shown in Figure 2 a tank 25 is provided having a glass bottom 26. An inclined mirror 27 is provided below the tank, and light directed by a condenser 28 from a suitable source 29 is caused to impinge on the inclined mirror and to be reflected upwardly through the liquid. Above the liquid is a projection lens 33, a mirror 34 and screen 35, similarly to the parts 20, 21, 2 of Figure 1. This apparatus operates satisfactorily where the objects to be tested have internal passages which run straight through them or where the external contour of appropriate test pieces has to be examined.

In the drawing, the test piece 31 is hollow. When, as shown, the hollow in the test piece 31 is of large diameter, it is useful to insert into the hollow from above an auxiliary reflector in the form of a liner 32 which is smaller than the hollow and of approximately the same shape and has a bright external reflecting surface. This increases the internal reflection of the light and improves the brightness of the image.

On the other hand, if the inner member 32 is the test piece and is solid as shown, it may be surrounded with a member such as 31 having a brightly finished hollow interior which is more or less parallel to but spaced from the test piece in order to increase the brightness of the image. In either case the image is projected, as before described in connection with the first form of the apparatus, through a suitable projection lens on to a screen.

Figure 3:
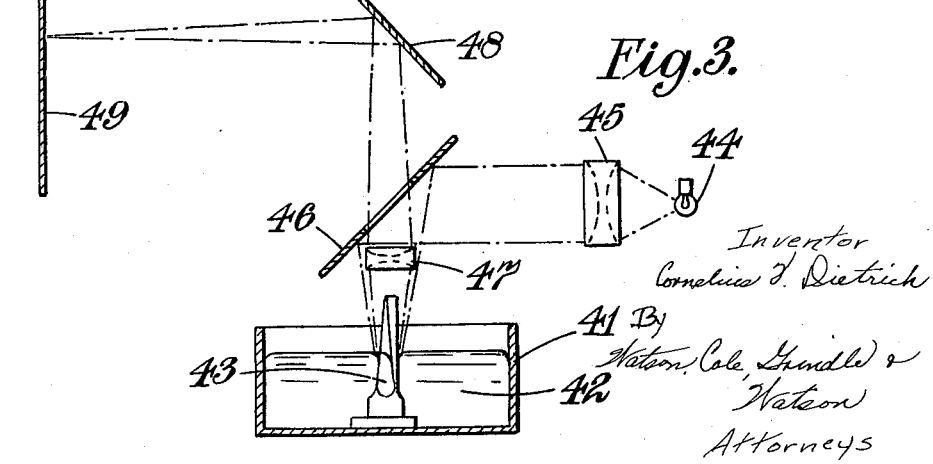
Figure 3 shows yet a third form.

Referring to Figure 3, this shows a vessel 41 which contains an opaque liquid 42, such as mercury, having a bright reflecting surface, a test object 43 being immersed to the depth at which a test of the shape of its periphery is required. Light from a source 44 passes through a condenser 45 and is reflected by a mirror 46 on to the metal surface. The mirror 46 has an aperture in its centre above a projection lens 47 which directs a beam of light on to a mirror 48 and thence to a screen 49 on which the image of the line where the liquid 42 makes contact with the test object 43 is focused.

I claim:
1. A method of indicating the profile of an article comprising the successive steps of immersing the article in a liquid of low refractive index, removing the article and, while some of the liquid is still adherent thereto, partially immersing the article in a dissimilar liquid of higher refractive index and immiscible with the liquid of low refractive index, so as to form a contact line between the surface of the dissimilar liquid and the liquid bearing surface of the article at the profile to be determined, and viewing the contact line.

2. A method of indicating the profile of the internal surface of a bore in an article at a particular depth in the bore comprising the successive steps of filling the bore with a liquid of low refractive index, emptying the bore and, while some of the liquid is still adherent thereto, partially filling the bore up to the level of the profile with a dissimilar liquid of higher refractive index and immiscible with the liquid of low refractive index, so as to form a contact line between the surface of the dissimilar liquid and the liquid bearing internal surface of the bore at the profile to be determined, and viewing the contact line.

3. A method as claimed in claim 2 wherein the light is transmitted through the said dissimilar liquid in the bore upwardly to the contact line at the profile to be determined in order to illuminate the contact line.

4. A method as claimed in claim 3 wherein a core is mounted within the bore in the article, the core having a bright reflecting surface extending substantially parallel to the internal surface of the bore, for the purpose described.

References Cited in the file of this patent
UNITED STATES PATENTS

| | | |
|---|---|---|
| 773,154 | McFerran | Oct. 25, 1904 |
| 2,466,161 | Doll | Apr. 5, 1949 |
| 2,596,897 | Haatvedt | May 13, 1952 |
| 2,645,971 | Herbst | July 21, 1953 |
| 2,665,327 | Martin | Jan. 5, 1954 |